(12) United States Patent
Chien et al.

(10) Patent No.: US 8,898,392 B2
(45) Date of Patent: Nov. 25, 2014

(54) DATA STORAGE SYSTEM INCLUDING BACKUP MEMORY AND MANAGING METHOD THEREOF

(75) Inventors: Hung-Ming Chien, Hsin-Chu (TW); Che-Jen Wang, Hsin-Chu (TW); Yi-Hua Peng, Hsin-Chu (TW)

(73) Assignee: Promise Technology, Inc., Hsin-Chu (TW)

( * ) Notice: Subject to any disclaimer, the term of this patent is extended or adjusted under 35 U.S.C. 154(b) by 223 days.

(21) Appl. No.: 13/399,075

(22) Filed: Feb. 17, 2012

(65) Prior Publication Data

US 2013/0067171 A1    Mar. 14, 2013

(30) Foreign Application Priority Data

Sep. 8, 2011  (TW) .............................. 100132332 A

(51) Int. Cl.
*G06F 12/00* (2006.01)
*G06F 11/14* (2006.01)
*G06F 12/08* (2006.01)
*G06F 11/16* (2006.01)
*G06F 11/20* (2006.01)

(52) U.S. Cl.
CPC ........ *G06F 11/1441* (2013.01); *G06F 12/0804* (2013.01); *G06F 12/0866* (2013.01); *G06F 2212/262* (2013.01); *G06F 11/1666* (2013.01); *G06F 11/2015* (2013.01)

USPC .......... 711/141; 711/113; 711/118; 711/135; 711/162

(58) Field of Classification Search
USPC ......................................... 711/141
See application file for complete search history.

(56) References Cited

U.S. PATENT DOCUMENTS

| | | | |
|---|---|---|---|
| 8,145,932 B2 * | 3/2012 | Dawkins et al. ............... | 713/323 |
| 2002/0049746 A1 * | 4/2002 | De Roose ......................... | 707/1 |
| 2005/0182906 A1 * | 8/2005 | Chatterjee et al. ............ | 711/144 |
| 2007/0150677 A1 * | 6/2007 | Homma et al. ............... | 711/162 |
| 2008/0126615 A1 * | 5/2008 | Sinclair et al. ................. | 710/38 |

* cited by examiner

*Primary Examiner* — April Y Blair
*Assistant Examiner* — Prasith Thammavong
(74) *Attorney, Agent, or Firm* — Thomas | Horstemeyer, LLP

(57) ABSTRACT

The invention discloses a data storage system and managing method thereof. The data storage system according to the invention includes N storage devices, a backup memory and a controller where N is a natural number. Each storage device has a respective write cache. Once the data storage system suffers from power failure, the backup memory still reserves data stored therein. The controller receives data transmitted from an application I/O request unit, executes a predetermined operation for the received data to generate data to be written, transmits the data to be written to the write caches of the storage devices, duplicates the data to be written into the backup memory, and labels the duplicated data in the backup memory as being valid in response to a writing confirm message sent from the storage devices.

9 Claims, 6 Drawing Sheets

DATA STORAGE SYSTEM INCLUDING BACKUP MEMORY AND MANAGING METHOD THEREOF

CROSS-REFERENCE TO RELATED APPLICATION

This utility application claims priority to Taiwan Application Serial Number 100132332, filed Sep. 8, 2011, which is incorporated herein by reference.

BACKGROUND OF THE INVENTION

1. Field of the Invention

The invention relates to a data storage system and a managing method thereof, especially for the data storage system specified in RAID architecture. Moreover, in particular, the data storage system according to the invention includes a backup memory for preventing from loss of data to be written and for protecting the data to be written once the data storage system suffers from power failure.

2. Description of the Prior Art

With more and more amount of user data stored as demanded, Redundant Array of Independent Drives (RAID) systems have been widely used to store a large amount of digital data. RAID systems are able to provide high availability, high performance, or high volume of data storage volume for hosts.

The RAID system utilizes various technologies known as RAID levels, and also to be divided into RAID 0, RAID 1, RAID 2, RAID 3, RAID 4, RAID 5, and RAID 6. Each RAID level of technology has its own advantages and disadvantages.

Constitution of the well-known RAID system includes a RAID controller and a RAID composed of a plurality of disk drives. The RAID controller is coupled to each disk drive, and defines the disk drives as one or more logical disk drives selected among RAID 0, RAID 1, RAID 2, RAID 3, RAID 4, RAID 5, RAID 6, and others.

Referring to FIG. 1, the architecture of a typical data storage system 1 specified in RAID 5 architecture is illustratively shown in FIG. 1. The data storage system 1 includes a plurality of storage devices 12 and a controller 10.

In one embodiment, the storage devices 12 are specified in a RAID architecture such as RAID 0, RAID 1, RAID 2, RAID 3, RAID 4, RAID 5, RAID 6, and so on.

The controller 10 is capable of generating (reconstructing) redundant data which are identical to data to be read. For example, in RAID 5 architecture, the controller 10 generates redundant data by Exclusive OR (XOR) operation.

In practical application, each of the storage devices 12 can be a tape drive, a disk drive, a memory device, an optical storage drive, a sector corresponding to a single read-write head in the same disk drive, or other equivalent storage devices.

Also as shown in FIG. 1, the controller 10 is respectively coupled to each of the storage devices 12. FIG. 1 also illustratively shows an application I/O request unit 2. The application I/O request unit 2 is coupled to the controller 10 through a transmission interface 14. In practical application, the application I/O request unit 2 can be a network computer, a mini-computer, a mainframe, a notebook computer, or any electronic equipment need to read or write data in the data storage system 1, e.g., a cell phone, a personal digital assistant (PDA), a digital recording apparatus, a digital music player, and so on.

When the application I/O request unit 2 is a stand-alone electronic equipment, it can be coupled to the data storage system 1 through a transmission interface such as a storage area network (SAN), a local area network (LAN), a serial ATA (SATA) interface, a fiber channel (FC), a small computer system interface (SCSI), and so on, or other I/O interfaces such as a PCI express interface. In addition, when the application I/O request unit 2 is a specific integrated circuit device or other equivalent devices capable of transmitting I/O read or write requests, it can send read or write requests to the controller 10 according to commands (or requests) from other devices, and then read or write data in the storage devices 12 via the controller 10.

The controller 10 and the storage devices 12 of the data storage system 1 can not only be installed in an enclosure, but also be separately installed in different enclosures. In practical application, the controller 10 can be coupled to the data storage devices 12 through transmission interfaces such as FC, SCSI, SAS, SATA, PATA, and so on. If the data storage devices 12 are disk drives, each of data storage devices 12 can be a disk drive of different interface such as FC, SCSI, SAS, SATA, PATA, and so on. The controller 10 can be a RAID controller or a controller capable of generating redundant data for the data storage system 1.

Also as shown in FIG. 1, each of the storage devices 12 includes a respective write cache 122. Each of the storage devices 12 can be divided into a plurality of blocks. On the viewpoint of fault tolerance, the plurality of blocks can be classified into two kinds of blocks which are the target data blocks and the parity data blocks. The target data blocks store general user data. The parity data blocks store the remaining parity data to provide to calculate the user data when the fault tolerant is required. The corresponding target data blocks and the parity data block in different data storage devices form a stripe, where data in the parity data block are a result of Exclusive OR (XOR) operation executed on the data in the target data blocks. It is noticed that those of ordinary skill in the art all understand the calculation of the data in the parity data blocks can also be executed by, other than Exclusive or (XOR) operation, various parity operations or similar operations which just have the relationship that data of any block can be obtained by calculating data of corresponding blocks in the same stripe.

If data at user side are to be written into the data storage system 1, the controller 10 receives data transmitted from the application I/O request unit 2 through the transmission interface 14. Then, the controller 10 performs a predetermined operation (for example, XOR operation) for the received data to generate data to be written. Afterward, the controller 10 transmitting the data to be written to the write caches 122 of the storage devices 12. After the data to be written are stored in the write cache 122 of the storage devices 12, the storage device 12 responses a writing confirm message to the controller 10. At this time, the controller 10 supposes that the data to be written have been written into the storage devices 12, and then do not protect the data to be written. Nevertheless, total of the data to be written stored in the storage devices 12 uncertainly have been written into media of the storage devices 12. Once the data storage system 1 suffers from non-anticipated power failure, the data to be written still stored in the write caches 122 of the storage devices 12 would be lost.

SUMMARY OF THE INVENTION

Accordingly, one scope of the invention is to provide a data storage system and a managing method thereof. Moreover, in particular, the data storage system according to the invention includes a backup memory for preventing from loss of data to be written and for protecting the data to be written once the data storage system suffers from power failure.

A data storage system, according to a preferred embodiment of the invention, includes N storage devices, a backup memory and a controller where N is a natural integer. Each of the storage devices includes a respective write cache. Once the data storage system suffers from power failure, the backup memory still reserves data stored therein. The controller is for receiving data transmitted from an application I/O request unit, executing a predetermined operation for the received data to generate data to be written, transmitting the data to be written to the write caches of the N storage devices, duplicating the data to be written into the backup memory, and labeling the duplicated data in the backup memory as being valid in response to a writing confirm message sent from the N storage devices. Moreover, when the controller judges that the storage space of the backup memory is less than a threshold or that the addresses in the backup memory where the data to be written are duplicated are overlapped, the controller issues a flush cache command to the N storage devices, and clears the data stored in the backup memory in response to a flush cache finish message sent from the N storage devices.

In one embodiment, when the data storage system is powered on, the controller judges whether the backup memory therein stores the data labeled as being valid. If the judging result is YES, the controller writes the data labeled as being valid in the backup memory into the N storage devices, and clears the data stored in the backup memory after finishing writing of the data labeled as being valid to the N storage devices.

In one embodiment, the predetermined operation can be an Exclusive OR (XOR) operation, a mirroring operation, a NO operation, a slice operation, a Galois field primitive polynomial operation, a maximum distance separable code operation over finite fields, other parity operations or similar operations.

In one embodiment, the backup memory can be a nonvolatile memory or a volatile memory equipped with an individual power source.

In one embodiment, the backup memory can be only electrically connected to the controller. In another embodiment, the backup memory can be a cache in the controller. In another embodiment, the backup memory can be electrically connected between the controller and the N storage devices.

A managing method, according to a preferred embodiment of the invention, is performed for a data storage system. The data storage system includes N storage devices and a backup memory where N is a natural number. Each storage device includes a respective write cache. Once the data storage system suffers from power failure, the backup memory still reserves data stored therein. The managing method is, firstly, to receive data transmitted from an application I/O request unit. Next, the managing method is to execute a predetermined operation for the received data to generate data to be written. Afterward, the managing method is to judge if the storage space of the backup memory is less than a threshold, or if the addresses in the backup memory where the data to be written are duplicated are overlapped. If the judging result is NO, the managing method is to transmit the data to be written to the write caches of the N storage devices, and to duplicate the data to be written into the backup memory. Moreover, the managing method is to label the duplicated data in the backup memory as being valid in response to a writing confirm message sent from the storage devices.

When the data storage system is powered on, the managing method according to the invention is to judge if the backup memory therein stores the data labeled as being valid. If the judging result is YES, the managing method is to write the data labeled as being valid in the backup memory into the N storage devices, and to clear the data stored in the backup memory after finishing writing of the data labeled as being valid into the N storage devices.

The advantage and spirit of the invention may be understood by the following recitations together with the appended drawings.

BRIEF DESCRIPTION OF THE APPENDED DRAWINGS

DETAILED DESCRIPTION OF THE INVENTION

The invention is to provide is to provide a data storage system and a managing method thereof. Moreover, in particular, the data storage system according to the invention includes a backup memory for preventing from loss of data to be written and for protecting the data to be written once the data storage system suffers from power failure. Some preferred embodiments and practical applications of this present invention would be explained in the following paragraph, describing the characteristics, spirit, advantages of the invention, and feasibility of embodiment.

Figure 1:
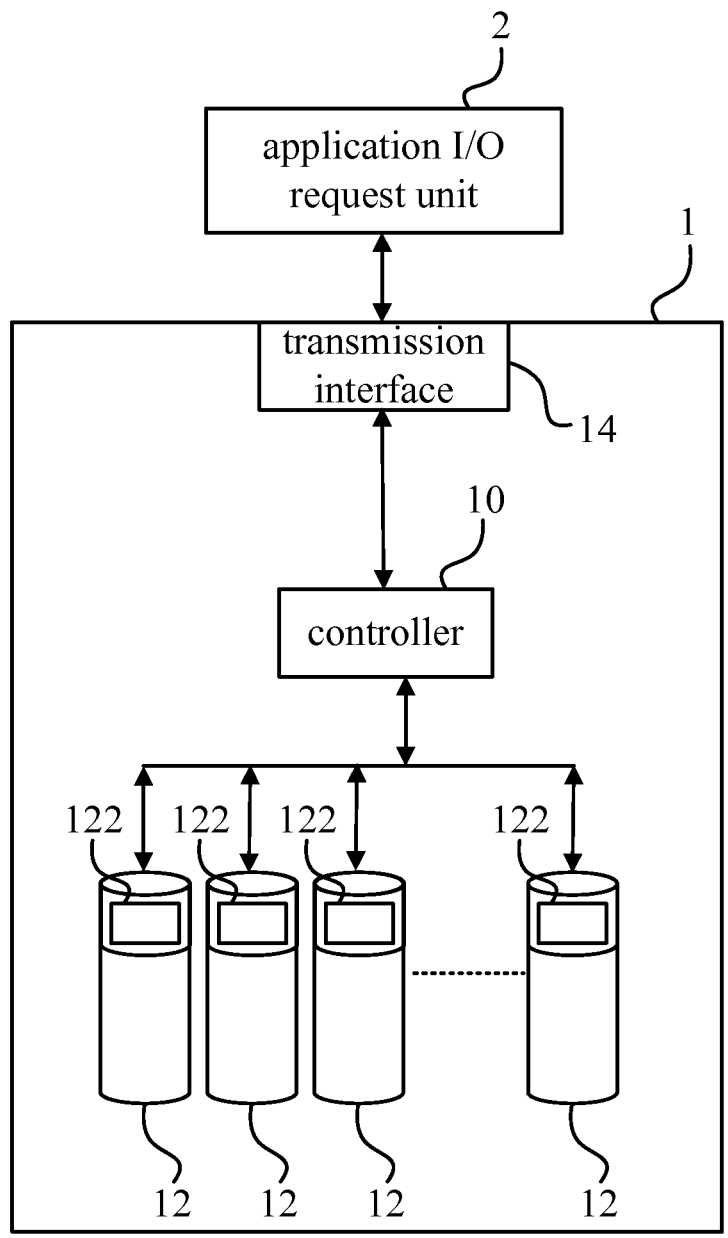
FIG. 1 is a schematic diagram showing the architecture of a conventional data storage system specified in RAID architecture.
Figure 2:
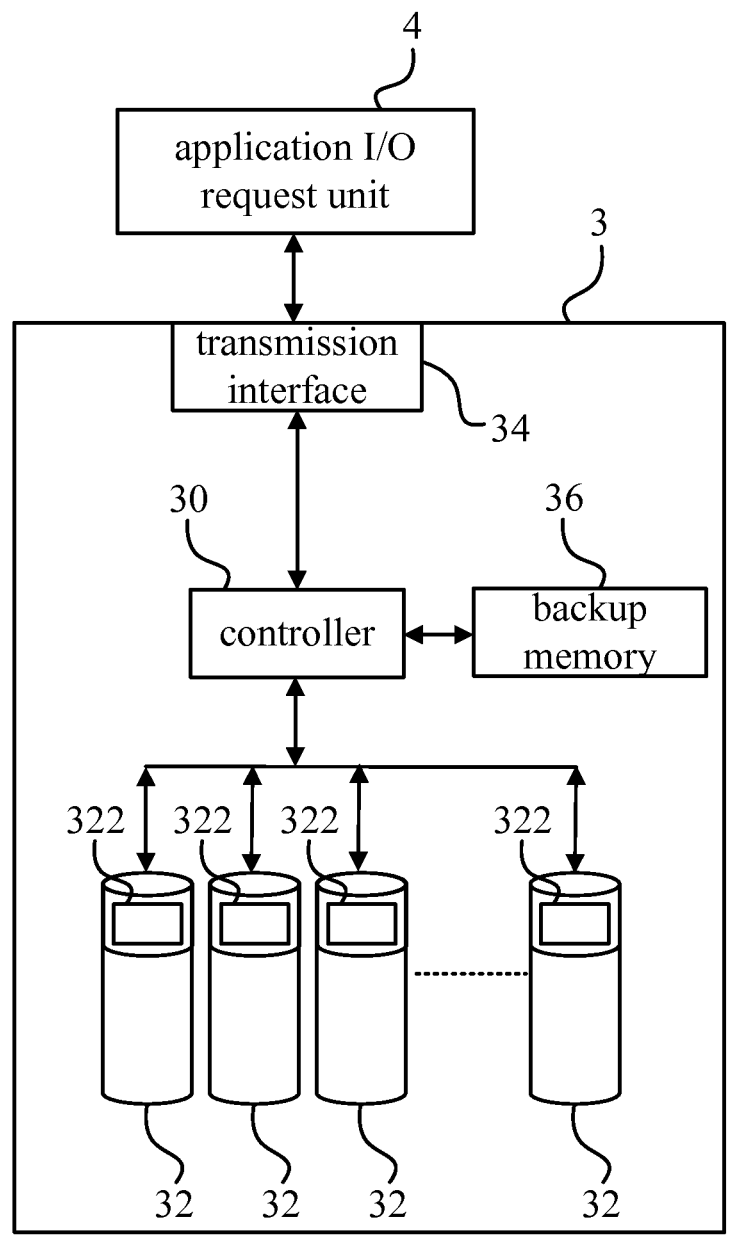
FIG. 2 is a schematic diagram showing the architecture of a data storage system according to a preferred embodiment of the invention.

Referring to FIG. 2, the architecture of a data storage system 3 according to a preferred embodiment of the invention is illustratively shown in FIG. 2. The data storage system 3 includes N storage devices 32, a controller 30 and a backup memory 36 where N is a natural number.

In one embodiment, the N storage devices 32 are specified in a RAID architecture such as RAID 0, RAID 1, RAID 2, RAID 3, RAID 4, RAID 5, RAID 6, and so on.

The controller 30 is capable of generating (reconstructing) redundant data which are identical to data to be read. For example, in RAID 5 architecture, the controller 30 generates redundant data by Exclusive OR (XOR) operation.

In practical application, each of the storage devices 32 can be a tape drive, a disk drive, a memory device, an optical storage drive, a sector corresponding to a single read-write head in the same disk drive, or other equivalent storage devices.

Also as shown in FIG. 2, the controller 30 is respectively coupled to each of the storage devices 32. FIG. 2 also illustratively shows an application I/O request unit 4. The application I/O request unit 4 is coupled to the controller 30 through a transmission interface 34. In practical application, the application I/O request unit 4 can be a network computer, a mini-computer, a mainframe, a notebook computer, or any electronic equipment need to read or write data in the data storage system 3, e.g., a cell phone, a personal digital assistant (PDA), a digital recording apparatus, a digital music player, and so on.

When the application I/O request unit 4 is a stand-alone electronic equipment, it can be coupled to the data storage system 3 through a transmission interface such as a storage area network (SAN), a local area network (LAN), a serial ATA (SATA) interface, a fiber channel (FC), a small computer system interface (SCSI), and so on, or other I/O interfaces such as a PCI express interface. In addition, when the application I/O request unit 4 is a specific integrated circuit device or other equivalent devices capable of transmitting I/O read or write requests, it can send read or write requests to the controller 30 according to commands (or requests) from other devices, and then read or write data in the storage devices 32 via the controller 30.

The controller 30 and the storage devices 32 of the data storage system 3 can not only be installed in an enclosure, but also be separately installed in different enclosures. In practice, the controller 30 can be coupled to the data storage devices 32 through transmission interfaces such as FC, SCSI, SAS, SATA, PATA, and so on. If the data storage devices 32 are disk drives, each of data storage devices 32 can be a disk drive of different interface such as FC, SCSI, SAS, SATA, PATA, and so on. The controller 30 can be a RAID controller or a controller capable of generating redundant data for the data storage system 3.

Also as shown in FIG. 2, each of the storage devices 32 includes a respective write cache 322. Each of the storage devices 32 can be divided into a plurality of blocks. On the viewpoint of fault tolerance, the plurality of blocks can be classified into two kinds of blocks which are the target data blocks and the parity data blocks. The target data blocks store general user data. The parity data blocks store the remaining parity data to provide to calculate the user data when the fault tolerant is required. The corresponding target data blocks and the parity data block in different data storage devices form a stripe, where data in the parity data block are a result of Exclusive OR (XOR) operation executed on the data in the target data blocks. It is noticed that those of ordinary skill in the art all understand the calculation of the data in the parity data blocks can also be executed for various RAID architectures by, other than Exclusive or (XOR) operation, a mirroring operation, a NO operation, a slice operation, a Galois field primitive polynomial operation, a maximum distance separable code operation over finite fields, other parity operations or similar operations which just have the relationship that data of any block can be obtained by calculating data of corresponding blocks in the same stripe.

If data at user side are to be written into the data storage system 3, the controller 30 receives data transmitted from the application I/O request unit 4 through the transmission interface 34. Then, the controller 30 performs a predetermined operation (for example, XOR operation) for the received data to generate data to be written. Afterward, the controller 30 transmitting the data to be written to the write caches 322 of the N storage devices 32. In particular, the controller 30 duplicates the data to be written into the backup memory 36.

After the data to be written are stored in the write cache 322 of the N storage devices 32, the storage device 32 responses a writing confirm message to the controller 30. At this time, the controller 30 labels the duplicated data in the backup memory 36 as being valid in response to the writing confirm message sent from the N storage devices 32, and still protects the data t be written. Nevertheless, total of the data to be written stored in the N storage devices 32 uncertainly have been written into media of the N storage devices 32.

Moreover, when the controller 30 judges that the storage space of the backup memory 36 is less than a threshold or that the addresses in the backup memory 36 where the data to be written are duplicated are overlapped, the controller 30 issues a flush cache command to the N storage devices 32. The N storage devices 32 write the data to be written stored in the write caches 322 into the media of the N storage devices 32 after receiving the flush cache command. After finishing writing total of the data to be written in the write caches 322 into the media of the N storage devices 32, the N storage devices 32 response a flush cache finish message to the controller 30. At this time, the controller 30 clears the data stored in the backup memory 36 in response to the flush cache finish message.

In particular, once the data storage system 3 suffers from non-anticipated power failure, the backup memory 36 still reserves the data stored therein. When the data storage system 3 is powered on, the controller 30 judges whether the backup memory 36 therein stores the data labeled as being valid. If the judging result is YES, the controller 30 writes the data labeled as being valid in the backup memory 36 into the N storage devices 32. Moreover, after finishing writing of the data labeled as being valid to the N storage devices 32, the controller 30 clears the data stored in the backup memory 36. Thereby, the data storage system 3 according to the invention can prevent from loss of the data to be written once suffering from power failure, and can ensure that the data to be written are written into the N storage devices 32.

In one embodiment, the backup memory 36 can be a non-volatile memory or a volatile memory equipped with an individual power source such as a battery.

In one embodiment, as shown in FIG. 2, the backup memory 36 can be only electrically connected to the controller 30.

Figure 3:
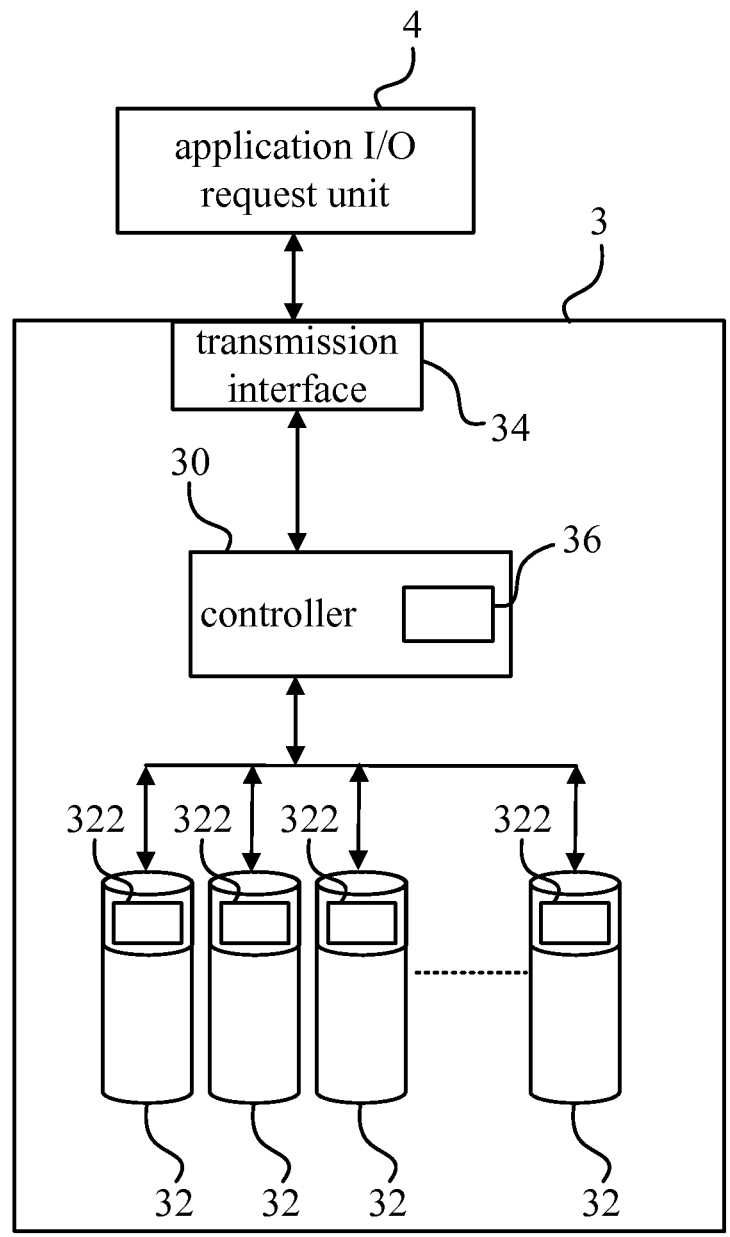
FIG. 3 is a schematic diagram showing a modification of the backup memory in the data storage system according to a preferred embodiment of the invention.

In another embodiment, as shown in FIG. 3, the backup memory 36 can be a cache in the controller 30. The components with the same numbers in FIG. 3 and FIG. 2 have the same or similar function or operation, and the related description will not be mentioned again here.

Figure 4:
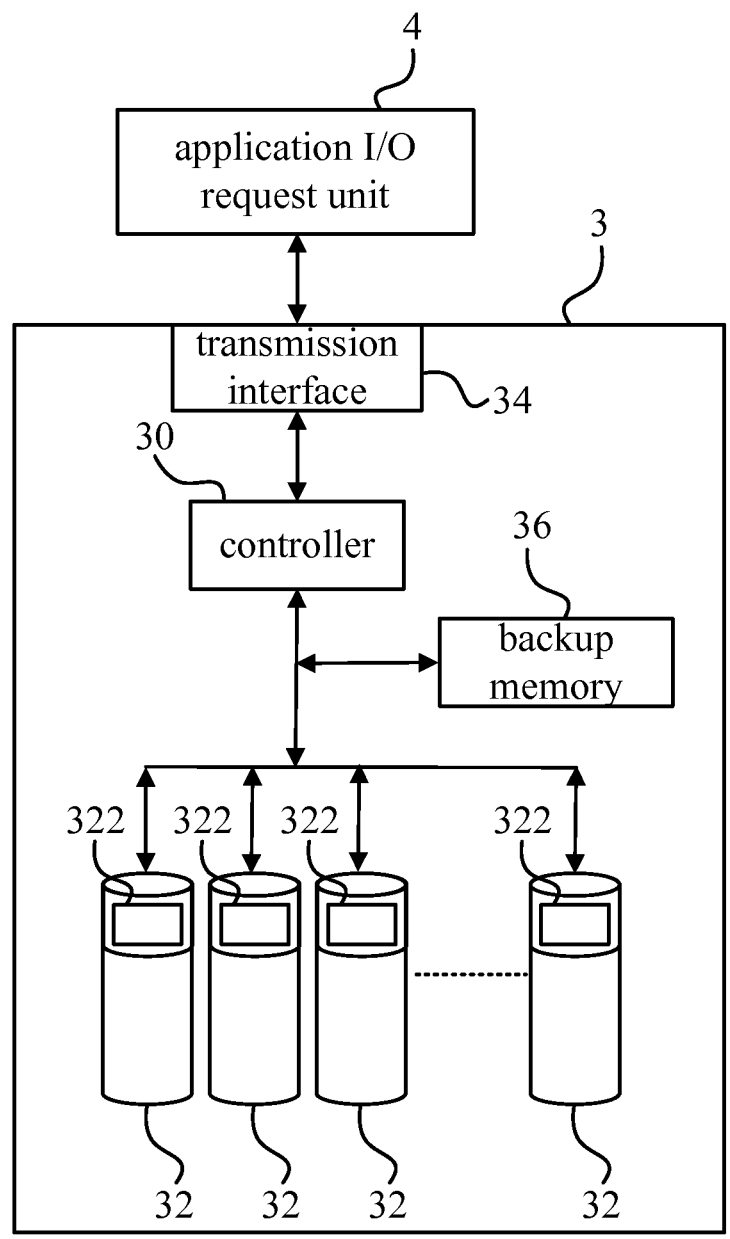
FIG. 4 is a schematic diagram showing another modification of the backup memory in the data storage system according to a preferred embodiment of the invention.

In another embodiment, as shown in FIG. 4, the backup memory 36 can be electrically connected between the controller 30 and the N storage devices 32. The components with the same numbers in FIG. 4 and FIG. 2 have the same or similar function or operation, and the related description will not be mentioned again here.

Figure 5:
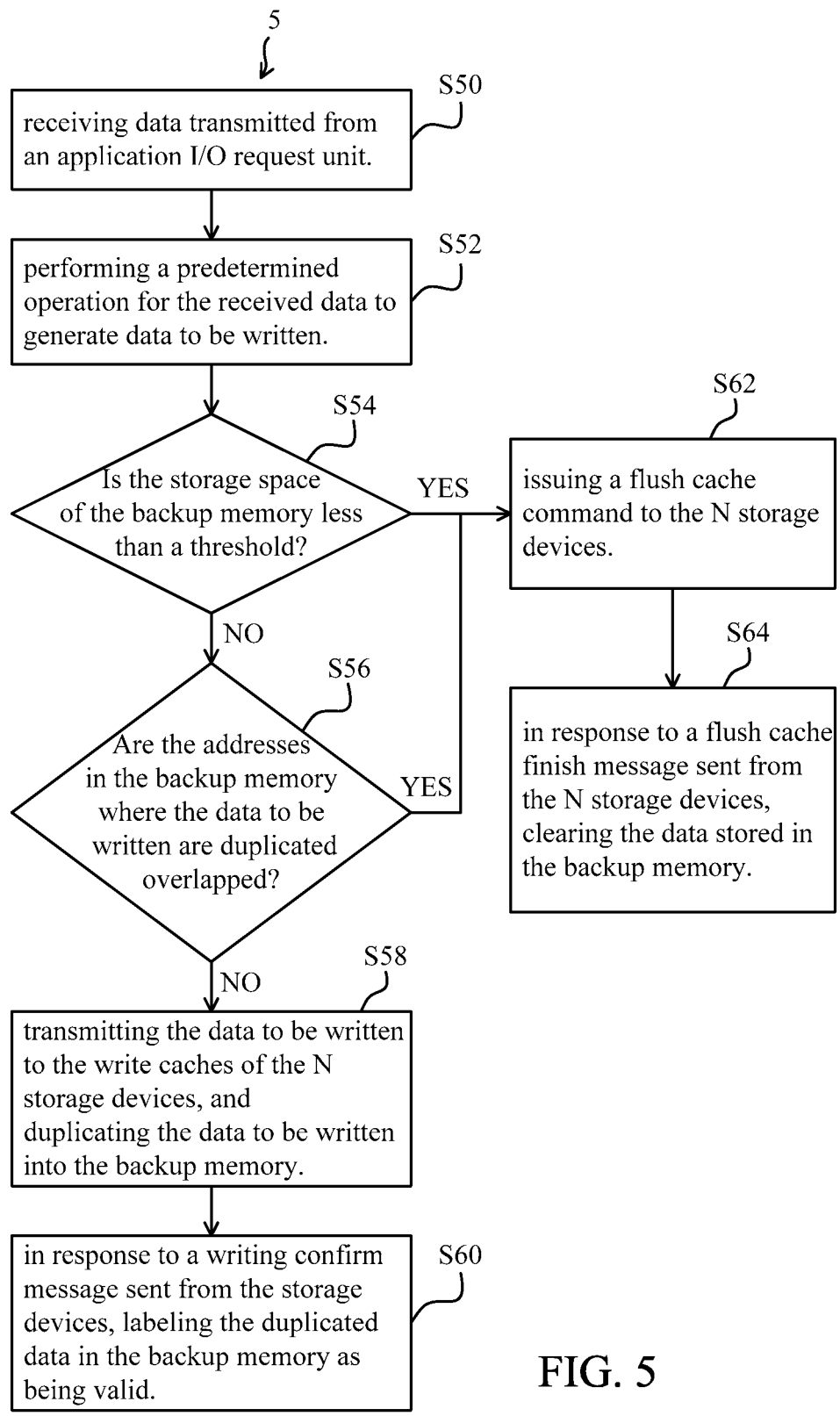
FIG. 5 is a flow diagram illustrating a managing method according to a preferred embodiment of the invention.

Referring to FIG. 5, FIG. 5 is a flow diagram illustrating a managing method 5 according to a preferred embodiment of the invention. The managing method 5 according to the invention is performed for a data storage system, e.g., the data storage system 3 shown in FIG. 2, FIG. 3 or FIG. 4. The architecture of the data storage system 3 has been described in detail hereinbefore, and the related description will not be mentioned again here.

As shown in FIG. 5, the managing method 5, firstly, performs step S50 to receive data transmitted from an application I/O request unit 4.

Next, the managing method 5 performs step S52 to execute a predetermined operation for the received data to generate data to be written.

In one embodiment, the predetermined operation can be an Exclusive OR (XOR) operation, a mirroring operation, a NO operation, a slice operation, a Galois field primitive polynomial operation, a maximum distance separable code operation over finite fields, other parity operations or similar operations.

Afterward, the managing method 5 performs step S54 to judge if the storage space of the backup memory 36 is less than a threshold.

If the judgment in step S54 is NO, the managing method 5 performs step S56 to judge if the addresses in the backup memory 36 where the data to be written are duplicated are overlapped.

If the judgment in step S56 is NO, the managing method 5 performs step S58 to transmit the data to be written to the write caches of the N storage devices 32, and to duplicate the data to be written into the backup memory 36.

After step S58, the managing method 5 performs step S60 to label the duplicated data in the backup memory 36 as being valid in response to a writing confirm message sent from the N storage devices 32.

If the judgment in step S54 is YES, or if the judgment in step S56 is YES, the managing method 5 performs step S62 to issue a flush cache command to the N storage devices 32. At this time, after finishing writing total of the data to be written in the write caches 322 into the media of the N storage devices 32, the N storage devices 32 response a flush cache finish message.

After step S62, the managing method 5 performs step S64 to clear the data stored in the backup memory 36 in response to the flush cache finish message sent from the N storage devices 32. After step S64, all procedures of the managing method 5 are completed.

Figure 6:
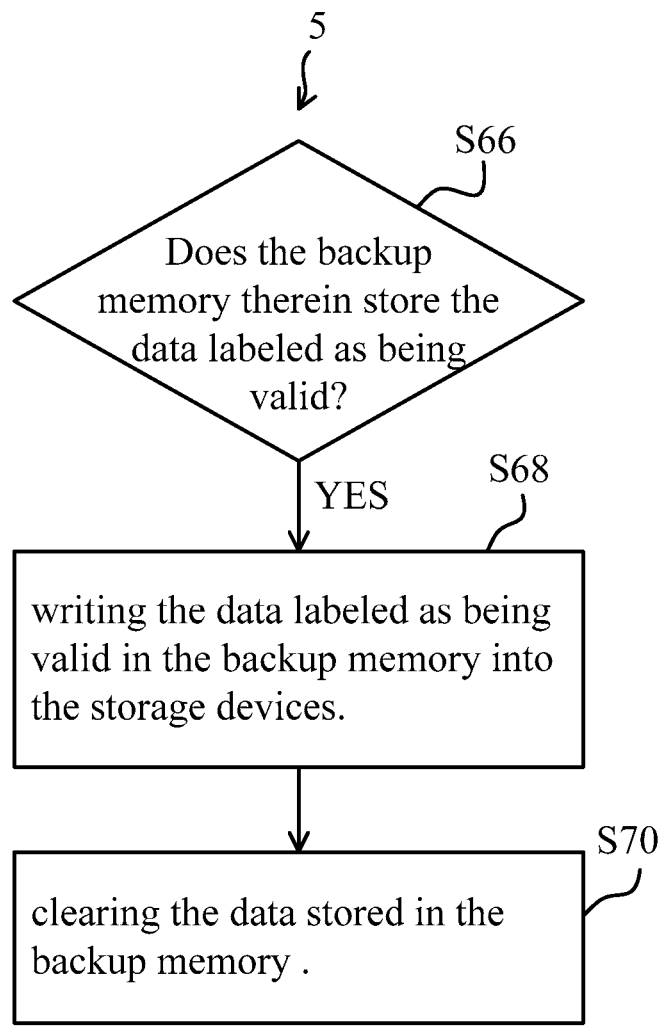
FIG. 6 is another flow diagram illustrating a managing method according to a preferred embodiment of the invention.

Referring FIG. 6, when the data storage system 3 is powered on, the managing method 5 according to the invention further performs step S66 to judge if the backup memory 36 therein stores the data labeled as being valid.

If the judgment in step S66 is YES, the managing method 5 further performs step S68 to write the data labeled as being valid in the backup memory 36 into the N storage devices 32. After step S68, that is after finishing writing of the data labeled as being valid into the N storage devices 32, the managing method 5 performs step S70 to clear the data stored in the backup memory 36. Thereby, the managing method 5 according to the invention can prevent from loss of the data to be written once the data storage system 3 suffers from power failure, and can ensure that the data to be written are written into the N storage devices 32.

With the detailed description of the above preferred embodiments of the invention, it is clear to understand that the data storage system and managing method thereof provided by the invention can prevent from loss of the data to be written once the data storage system suffers from power failure, and can protect the data to be written.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A data storage system, comprising:
   N storage devices which each comprises a respective write cache, N being a natural number;
   a single backup memory, once said data storage system suffers from power failure, the backup memory still reserving data stored therein; and
   a single controller, for receiving data transmitted from an application I/O request unit, executing a predetermined operation for the received data to generate data to be written, transmitting the data to be written to the write caches of the N storage devices, duplicating the data to be written into the single backup memory, and labeling the duplicated data in the single backup memory as being valid in response to a writing confirm message sent from the storage devices, wherein when the single controller judges that the storage space of the single backup memory is less than a threshold or that the addresses in the single backup memory where the data to be written are duplicated are overlapped, the single controller issues a flush cache command to the N storage devices, and clears the data stored in the single backup memory in response to a flush cache finish message sent from the N storage devices, wherein the single backup memory is only electrically connected to the single controller or one of the write caches in the single controller, or is electrically connected between the single controller and the N storage devices, and wherein the predetermined operation is one selected from the group consisting of an XOR operation, a mirroring operation, a NO operation, a slice operation, a Galois field primitive polynomial operation, and a maximum distance separable code operation over finite fields.

2. The data storage system of claim 1, wherein when said data storage system is powered on, the single controller judges whether the single backup memory therein stores the data labeled as being valid, and if YES, the single controller writes the data labeled as being valid in the single backup memory into the N storage devices, and clears the data stored in the single backup memory after finishing writing of the data labeled as being valid to the N storage devices.

3. The data storage system of claim 2, wherein the single backup memory is a non-volatile memory or a volatile memory equipped with an individual power source.

4. A managing method for a data storage system which comprises N storage devices and a single backup memory, N being a natural number, each storage device comprising a respective write cache, once said data storage system suffers from power failure, the single backup memory still reserving data stored therein, said managing method comprising the steps of:
   (a) receiving data transmitted from an application I/O request unit;
   (b) executing a predetermined operation for the received data to generate data to be written, wherein the predetermined operation is one selected from the group consisting of an XOR operation, a mirroring operation, a NO operation, a slice operation, a Galois field primitive polynomial operation, and a maximum distance separable code operation over finite fields;
   (c) judging if the storage space of the single backup memory is less than a threshold, or if the addresses in the single backup memory where the data to be written are duplicated are overlapped; and if NO in step (c), performing the steps of:
      transmitting the data to be written to the write caches of the N storage devices;
      duplicating the data to be written into the single backup memory; and
      in response to a writing confirm message sent from the storage devices, labeling the duplicated data in the single backup memory as being valid.

5. The managing method of claim 4, if YES in step (c), performing the steps of:
   issuing a flush cache command to the N storage devices; and in response to a flush cache finish message sent from the N storage devices, clearing the data stored in the single backup memory.

6. The managing method of claim 5, when said data storage system is powered on, performing the steps of:
judging if the single backup memory therein stores the data labeled as being valid;
and if YES, writing the data labeled as being valid in the single backup memory into the N storage devices, and clearing the data stored in the single backup memory after finishing writing of the data labeled as being valid into the N storage devices.

7. The managing method of claim 6, wherein the single backup memory is a non-volatile memory or a volatile memory equipped with an individual power source.

8. A data storage system, electrically coupled to an application I/O request unit, comprising:
N storage devices which each comprises a respective write cache, N being a natural number, the N storage devices selectively outputting a writing confirm message and a flush cache finish message;
a single backup memory, for reserving data stored in said data storage system once said data storage system suffers from power failure; and
a single controller, respectively electrically coupled to the N storage devices, for receiving data transmitted from the application I/O request unit, executing a predetermined operation for the received data to generate data to be written, transmitting the data to be written to the write caches of the N storage devices, duplicating the data to be written into the single backup memory, and labeling the duplicated data in the single backup memory as being valid in response to the writing confirm message, wherein when the storage space of the single backup memory is less than a threshold or when the addresses in the single backup memory where the data to be written are duplicated are overlapped, the controller issues a flush cache command to the N storage devices, and clears the data stored in the single backup memory in response to the flush cache finish message, wherein the single backup memory is only electrically connected to the single controller or one of the write caches in the controller, or is electrically connected between the single controller and the N storage devices, and wherein the predetermined operation is one selected from the group consisting of an XOR operation, a mirroring operation, a NO operation, a slice operation, a Galois field primitive polynomial operation, and a maximum distance separable code operation over finite fields.

9. The data storage system of claim 8, wherein when said data storage system is powered on, if the single backup memory therein stores the data labeled as being valid, the single controller writes the data labeled as being valid in the backup memory into the N storage devices, and clears the data stored in the backup memory after finishing writing of the data labeled as being valid into the N storage devices.

* * * * *